United States Patent
Wang et al.

(10) Patent No.: US 10,828,605 B2
(45) Date of Patent: Nov. 10, 2020

(54) REVERSE OSMOSIS SYSTEM FOR USE WITH A WELLBORE AND METHODS OF ASSEMBLING THE SAME

(71) Applicant: BL Technologies Inc., Minnetonka, MN (US)

(72) Inventors: Hua Wang, Clifton Park, NY (US); Hareesh Kumar Reddy Kommepalli, Albany, NY (US); Andrew Philip Shapiro, Schenectady, NY (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 140 days.

(21) Appl. No.: 15/125,294

(22) PCT Filed: Mar. 13, 2015

(86) PCT No.: PCT/US2015/020448
§ 371 (c)(1),
(2) Date: Sep. 12, 2016

(87) PCT Pub. No.: WO2015/138898
PCT Pub. Date: Sep. 17, 2015

(65) Prior Publication Data
US 2017/0173533 A1    Jun. 22, 2017

Related U.S. Application Data
(60) Provisional application No. 61/952,674, filed on Mar. 13, 2014.

(51) Int. Cl.
*B01D 61/02* (2006.01)
*B01D 61/08* (2006.01)
(Continued)

(52) U.S. Cl.
CPC ......... *B01D 61/025* (2013.01); *B01D 61/022* (2013.01); *B01D 61/08* (2013.01);
(Continued)

(58) Field of Classification Search
CPC .... B01D 61/025; B01D 61/022; B01D 61/08; B01D 2317/02; B01D 61/02;
(Continued)

(56) References Cited

U.S. PATENT DOCUMENTS

| | | | | |
|---|---|---|---|---|
| 6,955,222 B2* | 10/2005 | Lien | ..................... | B01D 61/027 166/275 |
| 2007/0080113 A1* | 4/2007 | Vuong | ................. | B01D 61/022 210/650 |

(Continued)

FOREIGN PATENT DOCUMENTS

| | | |
|---|---|---|
| GB | 1520877 A | 8/1978 |
| WO | 2005082497 A1 | 9/2005 |

(Continued)

OTHER PUBLICATIONS

International Search Report and Written Opinion issued in connection with corresponding PCT application PCT/US2015/020448 dated Jun. 1, 2015.

(Continued)

*Primary Examiner* — Pamela H Weiss

(57) ABSTRACT

A reverse osmosis unit for processing a feed solution is provided. The unit includes a pressure vessel includes an inlet end, an outlet end, and a vessel body extending between the inlet end and the outlet end. The reverse osmosis unit further includes a plurality of first membrane modules positioned within the pressure vessel. Each first membrane module of the plurality of first membrane modules has a first salt permeance value. At least one second membrane module is positioned within the pressure vessel and coupled in flow (Continued)

communication to the plurality of first membrane modules. The at least one second membrane module has a second salt permeance value that is different from the first salt permeance value.

3 Claims, 10 Drawing Sheets

(51) Int. Cl.
*C02F 1/44* (2006.01)
*E21B 43/20* (2006.01)
*C02F 1/00* (2006.01)

(52) U.S. Cl.
CPC .............. *C02F 1/008* (2013.01); *C02F 1/441* (2013.01); *E21B 43/20* (2013.01); *B01D 61/02* (2013.01); *B01D 2317/00* (2013.01); *B01D 2317/02* (2013.01); *C02F 2209/005* (2013.01)

(58) Field of Classification Search
CPC ...... B01D 2317/00; C02F 1/008; C02F 1/441; C02F 2209/005
See application file for complete search history.

(56) References Cited

U.S. PATENT DOCUMENTS

| | | | | |
|---|---|---|---|---|
| 2008/0000809 | A1* | 1/2008 | Wang | B01D 61/025 208/251 R |
| 2008/0169098 | A1* | 7/2008 | Christopher | B01D 61/025 166/275 |
| 2009/0050320 | A1* | 2/2009 | Collins | E21B 43/20 166/266 |
| 2010/0096129 | A1* | 4/2010 | Hinkel | E21B 43/16 166/270.1 |
| 2012/0067820 | A1* | 3/2012 | Henthorne | B01D 61/02 210/641 |
| 2012/0227975 | A1* | 9/2012 | Ayirala | E21B 43/20 166/344 |
| 2013/0090394 | A1* | 4/2013 | Husain | B01J 8/067 518/711 |
| 2013/0161256 | A1* | 6/2013 | Henthorne | B01D 61/12 210/641 |
| 2013/0213892 | A1* | 8/2013 | Henthorne | E21B 43/20 210/650 |
| 2014/0238235 | A1* | 8/2014 | Liu | B01D 53/228 95/52 |
| 2015/0260028 | A1* | 9/2015 | Kommepalli | E21B 43/40 166/265 |

FOREIGN PATENT DOCUMENTS

| | | | | |
|---|---|---|---|---|
| WO | 2007138327 | A1 | 12/2007 | |
| WO | 2007144591 | A1 | 12/2007 | |
| WO | 2011053752 | A1 | 5/2011 | |
| WO | WO-2012086478 | A1 * | 6/2012 | .............. C02F 1/441 |
| WO | 2013012548 | A1 | 1/2013 | |

OTHER PUBLICATIONS

Subhash C. Ayirala et. al.: "A Designer Water Processafor Offshore Low Salinity and Polymer Flooding Applications", SPE Improved Oil Recovery Symposium, Jan. 1, 2010 (Jan. 1, 2010, XP055188576, DOI:10.2118/129926-MS chapter 2; figures 1,2.
Bartels, Craig et al., "The effect of feed ionic strength on salt passage through reverse osmosis membranes", Desalination 184 (2005) 185-195.
European Patent Application No. 15713106.1, Office Action dated Jan. 25, 2019.
International Application No. PCT/US2015/020448, International Preliminary Report on Patentability dated Sep. 13, 2016.

* cited by examiner

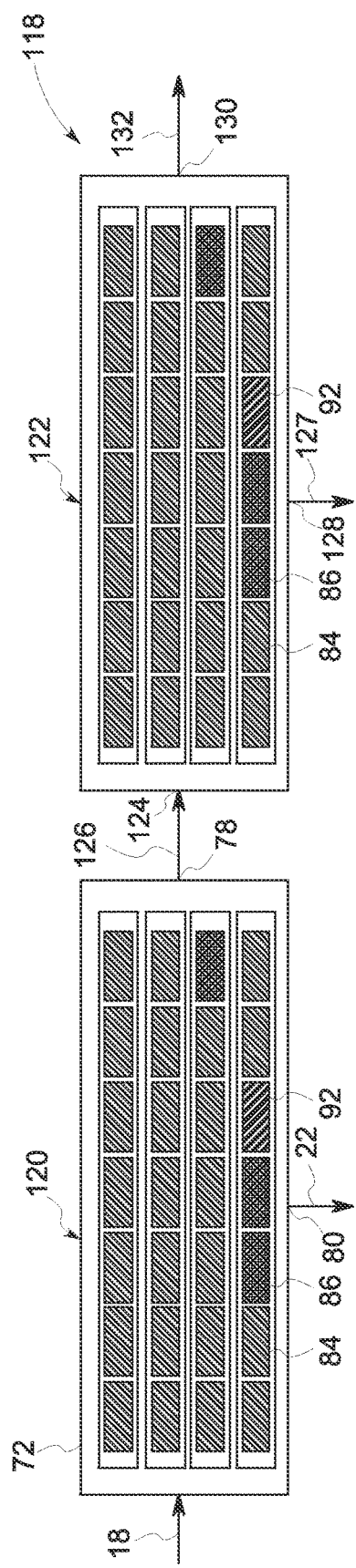
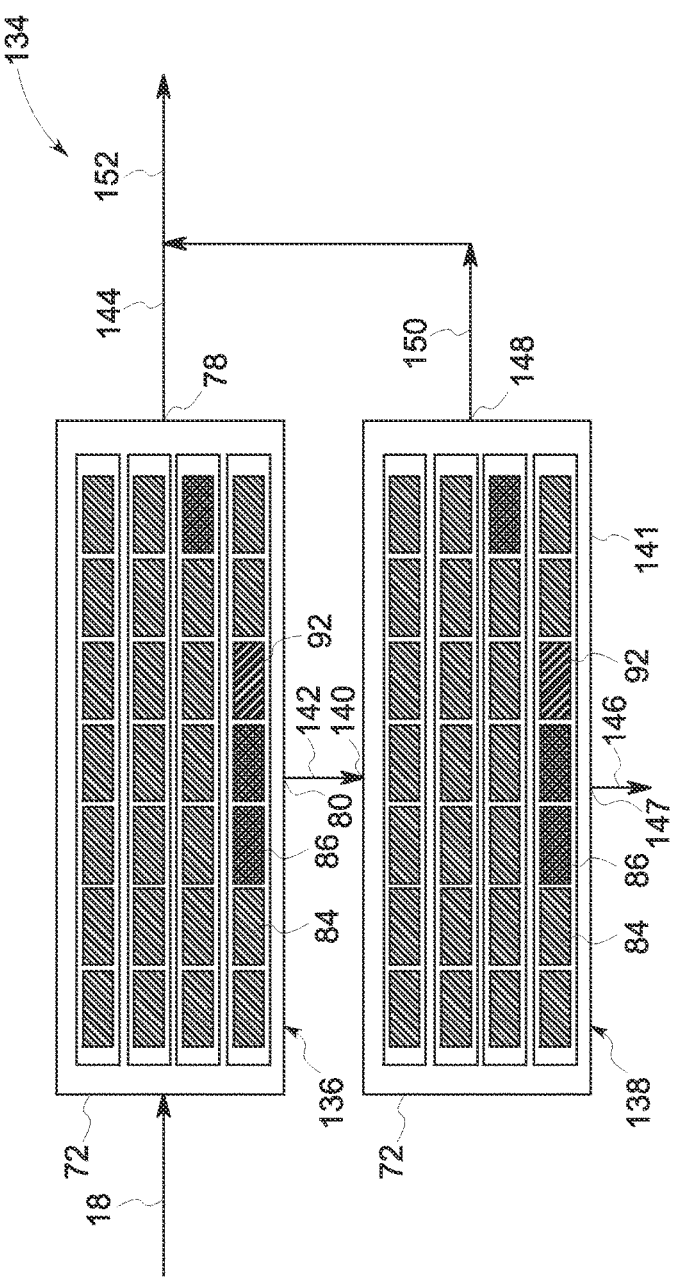
FIG. 13
FIG. 14

REVERSE OSMOSIS SYSTEM FOR USE WITH A WELLBORE AND METHODS OF ASSEMBLING THE SAME

BACKGROUND

The embodiments described herein relate generally to reverse osmosis systems, and more particularly, to methods and systems for recovering hydrocarbons from a porous subterranean geological formation using a permeate generated by the reverse osmosis systems.

In oil and/or gas wells, production fluid such as petroleum can be recovered from a reservoir of a geological formation as a result of the natural pressure of the reservoir. Due to a decline in reservoir pressure, some enhanced recovery processes may be used to extract more of the production fluid out of the geological formation. Water-flooding is a common enhanced recovery process wherein water is injected, under pressure, into the reservoir forcing the production fluid from the geological formation and into the well. Injection water may be supplied from rivers and aquifers for land based wells and from water for offshore wells.

In some secondary recovery processes, controlled salinity of the injection water may increase efficiency of the enhanced recovery process. Moreover, low salinity water-flooding may increase the efficiency of other chemical and/or polymer enhanced recovery processes and may provide cost savings by reducing chemical composition of the injection water. Depending on reservoir factors such as, but not limited to, rock mineralogy, formation water chemistry, production fluid composition, surface chemistry, formation pressure and formation temperature, an optimal salinity percentage of the injection water may be needed for specific reservoirs.

Current reverse osmosis systems may produce water meeting potable water requirements such as salinity having a range of 10 to 500 parts per million ("ppm"). For efficient and economical enhanced recovery processes, however, an optimal salinity of over 500 ppm may be needed. Moreover, for reservoirs having different fluid characteristics, controllable and/or adjustable salinity amounts may be needed for suitable enhanced recovery processes.

BRIEF SUMMARY

In one aspect, a reverse osmosis unit for processing a feed solution is provided. The unit includes a pressure vessel having an inlet end, an outlet end, and a vessel body extending between the inlet end and the outlet end. The reverse osmosis unit further includes a plurality of first membrane modules positioned within the pressure vessel. Each first membrane module of the plurality of first membrane modules has a first salt permeance value. At least one second membrane module is positioned within the pressure vessel and coupled in flow communication to the plurality of first membrane modules. The at least one second membrane module has a second salt permeance value that is different from the first salt permeance value.

In another aspect, a reverse osmosis system for processing a feed solution is provided. The system includes a pump configured to discharge the feed solution and a pressure vessel coupled in flow communication to the pump and configured to receive the feed solution. The pressure vessel includes an inlet end, an outlet end, and a vessel body extending between the inlet end and the outlet end. The reverse osmosis unit further includes a plurality of first membrane modules positioned within the pressure vessel. Each first membrane module of the plurality of first membrane modules has a first salt permeance value. At least one second membrane module is positioned within the pressure vessel and coupled in flow communication to the plurality of first membrane modules. The at least one second membrane module has a second salt permeance value that is different from the first salt permeance the plurality of first membrane modules and the at least one second membrane module are configured to process the feed solution into a permeate having a salinity of at least about 500 parts per million.

Still further, in one aspect, a method of manufacturing a reserve osmosis unit for processing a feed solution is provided. The method includes positioning a pressure vessel having an inlet end, an outlet end, and a vessel body extending between the inlet end and the outlet end. A plurality of first membrane modules is coupled to the pressure vessel, each first membrane module of the plurality of first membrane modules has a first salt permeance value. The method includes coupling at least one second membrane module in flow communication to the plurality of first membrane modules, the at least one second membrane module has a second salt permeance value that is different from the first salt permeance value by a difference of at least about $0.4 \times 10^{-5}$ cm/sec.

In one aspect, a method of processing a feed solution is provided. The method includes discharging the feed solution into a pressure vessel having an inlet end and an outlet end. The pressure vessel further includes a first membrane module and a second membrane module coupled in series between the inlet end and the outlet end. The method includes discharging the feed solution into the first membrane module having a first salt permeance value and configured to desalinate the feed solution into a first permeate and a first concentrate. The method includes discharging the first concentrate into the second membrane module having a second salt permeance value that is different from the first salt permeance value and configured to desalinate the first concentrate into a second permeate and a second concentrate, wherein a collective permeate of the first permeate and the second permeate has a salinity of at least about 500 parts per million.

In another aspect, a method of processing a feed solution is provided. The method includes discharging the feed solution into a pressure vessel includes an inlet end and an outlet end. The pressure vessel further includes a first membrane module and a second membrane module coupled in series between the inlet end and the outlet end. The method includes discharging the feed solution into the second membrane module having a second salt permeance value and configured to desalinate the feed solution into the a permeate and a concentrate. The method includes discharging the concentrate into the first membrane module having a first salt permeance value that is different from the second salt permeance value and configured to desalinate the concentrate into another permeate and another concentrate, wherein a collective permeate of the permeate and other permeate has a salinity of at least about 500 parts per million.

In one aspect, a method of processing a feed solution is provided. The method includes discharging the feed solution into a pressure vessel having an inlet end and an outlet end. The pressure vessel further includes a first membrane module, a second membrane module, and a third membrane module coupled in series between the inlet end and the outlet end. The method includes discharging the feed solution into the first membrane module having a first salt permeance value and configured to desalinate the feed solution into a first permeate and a first concentrate. The method includes discharging the first concentrate into the second membrane module having a second salt permeance value that is different from the first salt permeance value and configured to desalinate the first concentrate into a second permeate and a second concentrate. The method includes discharging the second concentrate into the third membrane modules having a third salt permeance value which is greater than the first salt permeance value and the second salt permeance value, the third membrane module configured to desalinate the second concentrate into a third concentrate and a third permeate, wherein a collective permeate of the first permeate, the second permeate, and the third permeate has a salinity of at least about 500 parts per mil lion.

Still further, in one aspect, a method of recovering a hydrocarbon fluid from a formation reservoir is provided. The method includes discharging the feed solution into a pressure vessel having an inlet end and an outlet end. The pressure vessel further includes a first membrane module and a second membrane module coupled in series between the inlet end and the outlet end. The method includes discharging the feed solution into the first membrane module having a first salt permeance value and configured to desalinate the feed solution into a first permeate and a second permeate. The method includes discharging the first concentrate into the second membrane module having a second salt permeance value that is different from the first salt permeance value and configured to desalinate the first concentrate into a second permeate and a second concentrate, wherein a collective permeate of the first permeate and the second permeate has a salinity of at least about 500 parts per million. The method includes controllably discharging at least a portion of the collective permeate having the salinity of at least about 500 parts per million into the formation reservoir. The method includes forcing the hydrocarbon fluid from the formation reservoir under pressure of the collective permeate and into a well casing.

DRAWINGS

These and other features, aspects, and advantages will become better understood when the following detailed description is read with reference to the accompanying drawings in which like characters represent like parts throughout the drawings, where:

FIG. 13 is a schematic of another alternative reverse osmosis unit;

FIG. 14 is a schematic of another alternative reverse osmosis unit;

Figure 1:
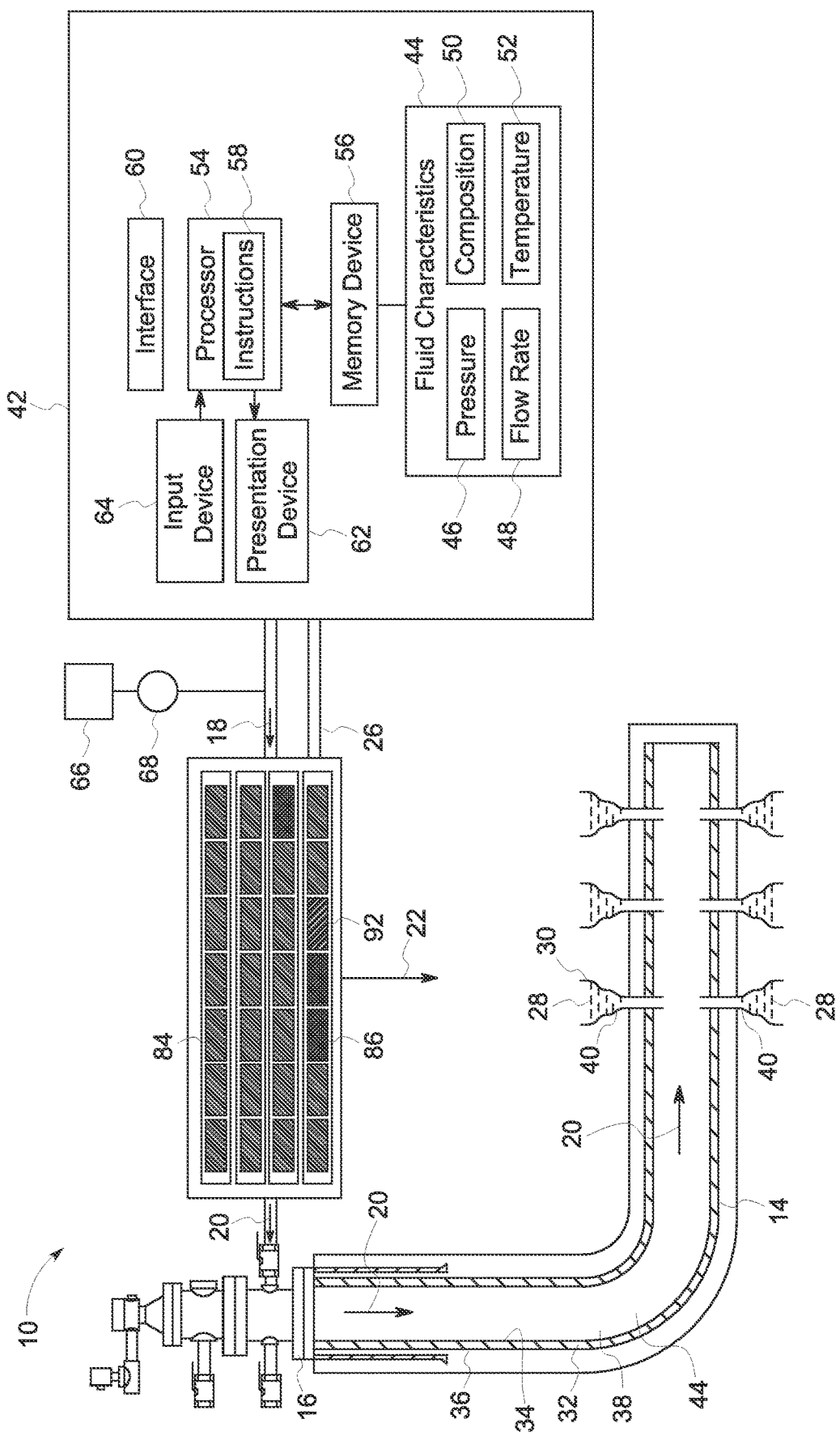
FIG. 1 is a cross-sectional side view of a well assembly having an exemplary reverse osmosis system coupled to a wellbore via a wellhead.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a system modified by a term or terms, such as "about" and "substantially", are not to be limited to the precise system specified. Here and throughout the specification and claims, range limitations may be combined and/or interchanged, such ranges are identified and include all the sub-ranges contained therein unless context or language indicates otherwise.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein. Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The embodiments described herein relate to systems and methods for performing a reverse osmosis process on an aqueous feed solution to form a permeate for use in a well casing. More particularly, the embodiments described herein enhance recovery of production fluid from a geological formation. The embodiments also relate to methods, systems, and/or apparatus for desalinating the aqueous feed solution to form a permeate having a salinity range of at least 1000 parts per million ("ppm") to facilitate improvement of well production performance. It should be understood that the embodiments described herein include a variety of types of well assemblies, and further understood that the descriptions and figures that utilize hydrocarbon formations are exemplary only. The exemplary reverse osmosis system is configured to be a hybrid, controllable reverse osmosis desalination system to produce desalinated water with controlled salinity for low salinity water-flooding to facilitate enhanced production fluid recovery.

FIG. 1 is a cross-sectional side view of a well assembly 10 having an exemplary reverse osmosis system 12 coupled to a wellbore 14 via a wellhead 16. Reverse osmosis system 12 is configured to process a feed solution 18 into a permeate 20 and concentrate 22. For reverse osmosis system 12, fluid pressure is applied to the high solute concentration side of a membrane to force flow of solvent across the membrane, from high solute concentration side to lower solute concentration side, which produces a purified solvent solution. In the exemplary embodiments, the term "reverse osmosis" includes both "tight" reverse osmosis, where all salts are substantially rejected by the reverse osmosis membrane, and "loose" reverse osmosis, where some salts such as, for example only, monovalent salts, are substantially passed while other salts such as, for example only, divalent salts, are selectively rejected by the membrane. Both "tight" and "loose" reverse osmosis are based on the same principal in that pressure is applied to the membrane to overcome an osmotic pressure difference and forces solvent through a membrane. Loose reverse osmosis may be known as nanofiltration.

Reverse osmosis system 12 is configured to discharge permeate 20 within wellbore 14 which is associated with a geological formation 28 containing desirable production fluid 30, such as, but not limited to, petroleum. Wellbore 14 is drilled into geological formation 28 and lined with a well casing 32. Well casing 32 includes an inner sidewall 34, an outer sidewall 36, and a casing bore 38 defined by inner sidewall 34. Well casing 32 may be positioned in any orientation within geological formation 28 to enable reverse osmosis system 12 to function as described herein. A plurality of perforations 40 is formed through well casing 32 to permit fluid 30 to flow from geological formation 28 and into well casing 32.

Reverse osmosis system 12 is coupled, via a communication wire 26, to a computing device 42 for use in analyzing fluid characteristics 44 of feed solution 18, permeate 20, and concentrate 22. Fluid characteristics 44 include, but are not limited to, pressures 46, flow rates 48, fluid compositions 50, and temperatures 52. Computing device 42 includes a processor 54 and a memory 56. Processor 54 includes a processing unit, such as, without limitation, an integrated circuit (IC), an application specific integrated circuit (ASIC), a microcomputer, a programmable logic controller (PLC), and/or any other programmable circuit. Processor 54 may include multiple processing units (e.g., in a multi-core configuration). Computing device 42 is configurable to perform the operations described herein by programming processor 54. For example, processor 54 may be programmed by encoding an operation as one or more executable instructions and providing the executable instructions to processor 54 in memory 56 coupled to processor 54. Memory 56 includes, without limitation, one or more random access memory (RAM) devices, one or more storage devices, and/or one or more computer readable media. Memory 56 is configured to store data, such as computer-executable instructions. Memory 56 includes any device allowing instruction 58, such as executable instructions and/or other data, to be stored and retrieved.

Stored in memory 56 are, for example, readable instructions provided by for a user (not shown). Computing device 42 further includes a user interface 60 and a presentation device 62. User interface 60 may include, among other possibilities, a web browser and/or a client application. Web browsers and client applications enable users to display and interact with media and other information. Exemplary client applications include, without limitation, a software application for managing one or more computing devices 42.

Computing device 42 includes at least one presentation device 62 for presenting information to the user. Presentation device 62 is any component capable of conveying information to the user. Presentation device 62 includes, without limitation, a display device (not shown) (e.g., a liquid crystal display (LCD), organic light emitting diode (OLED) display, or "electronic ink" display) and/or an audio output device (e.g., a speaker or headphones). Presentation device 62 includes an output adapter (not shown), such as a video adapter and/or an audio adapter. Output adapter is operatively coupled to processor 54 and configured to be operatively coupled to an output device (not shown), such as a display device or an audio output device.

Moreover, computing device 42 includes input device 64 for receiving input from the user. Input device 64 includes, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 62 and input device 64. Computing device 42 can be communicatively coupled to a network (not shown).

Figure 2:
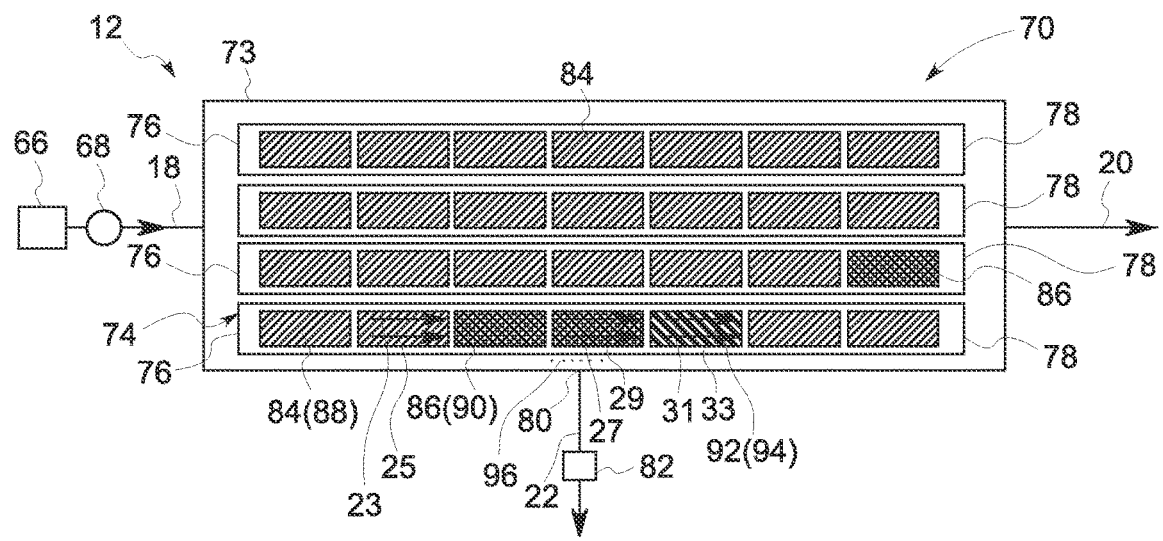
FIG. 2 is a schematic view of the reverse osmosis system shown in FIG. 1.

FIG. 2 is a schematic view of reverse osmosis system 12. Reverse osmosis system 12 can include a land base system, a subterranean system, an offshore platform system, and an underwater system (none shown). Reverse osmosis system 12 can include any configuration to enable desalinization of feed solution 18. Reverse osmosis system 12 includes a feed solution source 66 such as, but not limited to, a storage tank, a pipe line, an aquifer, and sea water. A pump 68 is coupled in flow communication to feed solution source 66. Feed solution source 66 is configured to hold and direct an amount of feed solution 18 to pump 68. Reverse osmosis system 12 may further include other components such as, but not limited to, pretreatment units, media filtration units, cartridge filtration units, micro-filtration units, and ultra-filtration units. Reverse osmosis system 12 further includes a reverse osmosis unit 70 having a pressure vessel 74. Although four pressure vessels 74 are shown, any number of pressure vessels 74 may be used. Each pressure vessel 74 includes an inlet end 76, an outlet end 78, and a vessel body 72 extending between inlet end 76 and outlet end 78. In an alternative embodiment, a membrane housing 73 may enclose a plurality of pressure vessels 74. Inlet end 76 is coupled in flow communication to pump 68 and outlet end 78 is coupled in flow communication to well casing 32 via wellhead 16 (both shown in FIG. 1). Alternatively, inlet ends 76 may be coupled to outlet ends 78 and/or vice versa among the plurality of pressure vessels 74. Moreover, each pressure vessel 74 includes another outlet end 80 coupled in flow communication to a concentrate storage 82 such as, but not limited to, a storage tank, a piping system and/or a discharge outlet. Outlet end 78 is configured to discharge permeate 20 out of pressure vessel 74 and into a well casing 32 (shown in FIG. 1). Outlet end 80 is configured to discharge concentrate 22 from pressure vessel 74. In the exemplary embodiment, a plurality of first membrane modules 84 is positioned within pressure vessel 74. Moreover, at least one second membrane module 86 is positioned within pressure vessel 74.

In the exemplary embodiment, a permeate flux Jw through reverse osmosis unit 70 is obtained from Eq. 1:

$$J_w = A \cdot TCF \cdot (\Delta P - \Delta \pi) \quad \text{(Eq. 1)}$$

where $J_w$ is a permeate 20 flux, A is the water permeance, or "A-value" (with units of $10^{-5}$ cm$^3$/cm$^2$-s-atm), at standard temperature of 25° C., TCF is a temperature correction factor for the water permeance, $\Delta P$ is the transmembrane pressure drop, and $\Delta \pi$ is the osmotic pressure difference across reverse osmosis unit 70.

A salt flux Js is given by Eq. 2:

$$J_s = B \cdot TCF \cdot (C_{sf} - C_{sp}) \quad \text{(Eq. 2)}$$

where B is a salt permeance, or "B-value" (with units of $10^{-5}$ (cm/s), and $C_{sf}$ and $C_{sp}$ are the salt concentrations in feed solutions and permeate solutions, respectively.

A salt passage SP and rejection R are calculated by Eqs. 3 and 4:

$$\text{Salt passage } SP = \frac{C_{sp}}{C_{sf}} \times 100\%, \text{ and} \quad \text{(Eq. 3)}$$

$$\text{Salt Rejection } R = \left(1 - \frac{C_{sp}}{C_{sf}}\right) \times 100\% \quad \text{(Eq. 4)}$$

In the exemplary embodiment, each first membrane module 84 and second membrane module 86 include asymmetric membranes prepared from a single polymeric material. Asymmetric membranes include a dense polymeric discriminating layer supported on a porous support formed from the same polymeric material. Alternatively, each first membrane module 84 and second membrane module 86 may include thin-film composite membranes prepared from a first and a second polymeric material. Examples include asymmetric cellulose acetate membranes. Thin-film composite membranes comprise a permselective discriminating layer formed from a first polymeric material anchored onto a porous support material formed from a second polymeric material. The permselective discriminating layer includes cross-linked polymeric material, for example, a cross-linked aromatic polyamide. The porous support material includes a polysulfone. Polyamide thin-film composite membranes have higher water fluxes, salt and organic rejections and can withstand higher temperatures and larger pH variations than asymmetric cellulose acetate membranes. Moreover, the polyamide thin-film composite membranes are also less susceptible to biological attack and compaction. First membrane modules 84 and second membrane module 86 are configured to reduced and/or eliminate significant amounts of dissolved solids from entering the treated low salinity water concentrate stream while allowing the water solvent to pass. In the exemplary embodiment, first membrane modules 84 and second membrane module 86 include a spiral wound membrane located within pressure vessel 74. Alternatively, first membrane module 84 and second membrane module 86 can include a hollow fiber configuration. Alternatively, first membrane 84 and second membrane 86 can include reverse osmosis membrane and/or nanofiltration membranes. Still further, in an alternative embodiment, first membrane 84 and second membrane 86 can include membranes that are configured to process monovalent ions and/or divalent ions. First membrane modules 84 and second membrane module 86 may include any membrane configuration to enable reverse osmosis unit 70 to function as described herein.

The plurality of first membrane modules 84 and second membrane module 86 are selectively arranged within pressure vessel 74 and with respect to each other to facilitate desalinating feed solution 18 into permeate 20 and concentrate 22. Each first membrane module 84 of the plurality of first membrane modules 84 has a first salt permeance value 88. Second membrane module 86 has a second salt permeance value 90 that is different than first salt permeance value. In the exemplary embodiment, the second salt permeance value 90 is greater than first salt permeance value 88. More particularly, second salt permeance value 90 is greater than first salt permeance value 88 by a difference of at least about 0.4×10$^{-5}$ cm/sec. Still further, in the exemplary embodiment, second salt permeance value is greater than first salt permeance value 88 by a difference having a range from about 0.4×10$^{-5}$ cm/sec to 300×10$^{-5}$ cm/sec. Alternatively, second salt permeance value 90 may be less than first salt permeance value 88. First salt permeance value 88 and second salt permeance value 90 can include any value to enable reverse osmosis system 12 to function as described herein.

The selective arrangement of the plurality of first membrane modules 84 and second membrane module 86 within pressure vessel 74 and the difference between first salt permeance value 88 and second salt permeance value 90 are configured to facilitate processing wherein permeate 20 has a salinity of at least about 500 ppm as described herein. More particularly, reverse osmosis unit 70 is configured to process wherein permeate 20 has salinity from a range from about 500 ppm to about 10,000 ppm. Still further, in the exemplary embodiment, reverse osmosis unit 70 is configured to process permeate 20 to have salinity having a range from about 10,000 ppm to about 30,000 ppm. Alternatively, reverse osmosis unit 70 is configured to process wherein permeate 20 has salinity of less than 500 ppm and/or more than 30,000 ppm. Reverse osmosis unit 70 is configured to process permeate 20 to have any salinity amount to facilitate enhancing recovery process from geological formation.

In the exemplary embodiment, reverse osmosis of unit 70 includes at least one third membrane module 92 positioned within pressure vessel 74 and selectively arranged among the plurality of first membrane modules 84 and second membrane module 86. Third membrane module 92 has a third salt permeance value 94 that is different than first salt permeance value 88 and/or second salt permeance value 90. In the exemplary embodiment, third salt permeance value 94 is greater than first salt permeance value 88 and/or second salt permeance value 90. The selective arrangement of the plurality of first membrane module 84, second membrane module 86, and third membrane module 92 and the differences between first salt permeance value 88, second salt permeance value 90, and third salt permeance value 94 facilitate processing wherein permeate 20 has a salinity of at least about 500 ppm as described herein.

During operation, computer device 42 is configured to selectively activate pump 68 to discharge feed solution 18 from feed solution source 66 into inlet end 76 of pressure vessel 74. While pumping feed solution 18, computing device 42, via sensors (not shown), monitors, measures, and/or analyzes fluid characteristics 44 of feed solution 18 and adjust pressure rate 46 and/or flow rate 48 of feed solution 18 through pump 68. Computing device 42 can control pump 68 to adjust and/or tune pressure rate 46 and/or flow rate 48 of feed solution 18 to predetermined perimeters to facilitate desalinating feed solution 18. Pump 68 discharges feed solution 18 into pressure vessel 74. Inlet end 76 directs feed solution 18 into the plurality of first membrane modules 84. First membrane modules 84, based at least on first salt permeance value 88, removes salt 96 from feed solution 18 to form a first permeate 23 and a first concentrate 25. After passing through first membrane modules 84, first concentrate 25 is desalinated and directed into second membrane module 86. Second membrane module 86, based at least on second salt permeance value 90, removes additional salt 96 to form a second permeate 27 and a second concentrate 29. Collective permeate 20 which includes a combination of first permeate 23 and second permeate 27 has a salinity of about at least about 500 ppm. Outlet end 78 directs collective permeate 20 through wellhead 16 (shown in FIG. 1) and into well casing 32 (shown in FIG. 1) for enhanced recovery processes.

Figure 3:
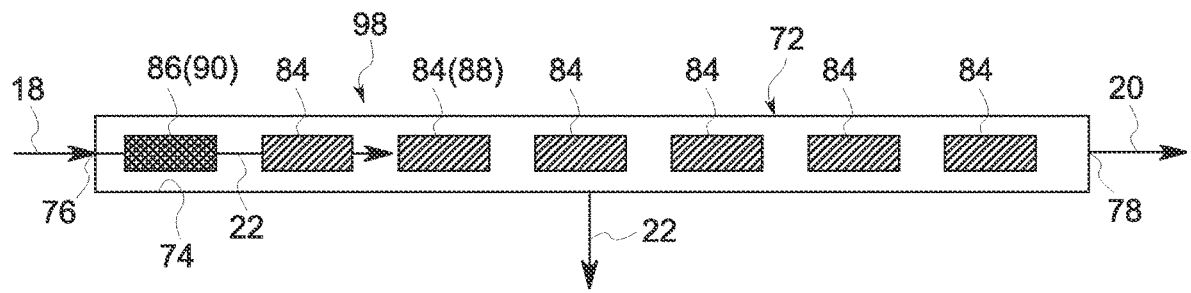
FIG. 3 is a schematic view of an exemplary arrangement of a pressure vessel of the reverse osmosis system shown in FIG. 2, the pressure vessel having a plurality of first membrane modules and a second membrane modules.

FIG. 3 is a schematic view of an arrangement 98 of pressure vessel 74 having the plurality of first membrane modules 84 and second membrane module 86. In the exemplary embodiment, second membrane module 86 is positioned within pressure vessel 74 and between inlet end 76 and the plurality of first membrane modules 84. Moreover, first membrane modules 84 and second membrane module 86 are coupled in series. Arrangement 98 is configured to desalinate feed solution 18 into concentrate 22 and permeate 20, wherein permeate 20 has salinity of at least about 500 ppm. More particularly, during operation, inlet end 76 discharges feed solution 18 initially into and through second membrane module 86, and subsequently, concentrate 22 into and through the plurality of first membrane modules 84.

Figure 4:
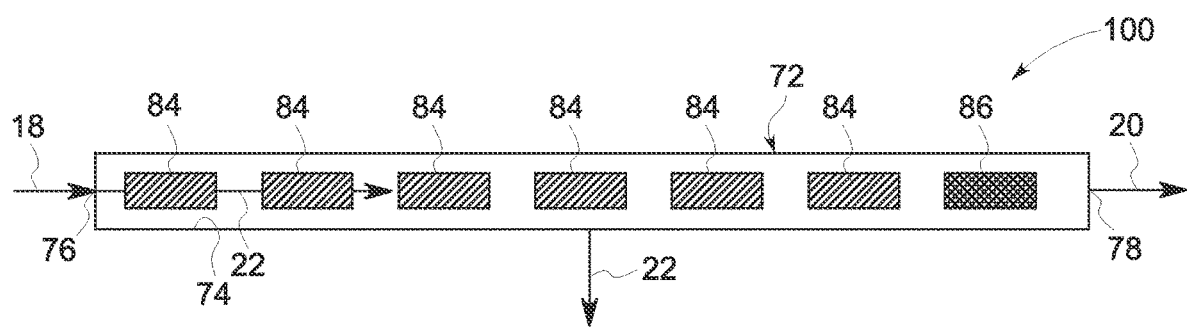
FIG. 4 is a schematic view of an alternative arrangement of the pressure vessel having the plurality of first membrane modules and second membrane module.

FIG. 4 is a schematic view of an alternative arrangement 100 of pressure vessel 74 having the plurality of first membrane modules 84 and second membrane module 86. In FIG. 4, similar components include the same element numbers as is shown in FIGS. 1-3. In the exemplary embodiment, second membrane module 86 is positioned within pressure vessel 74 and between outlet end 78 and the plurality of first membrane modules 84. Moreover, first membrane modules 84 and second membrane module 86 are coupled in series. Arrangement 100 is configured to desalinate feed solution 18 into concentrate 22 and permeate 20, wherein permeate 20 has salinity of at least about 500 ppm. More particularly, during operation, inlet end 76 discharges feed solution 18 initially into and through the plurality of first membrane modules 84, and subsequently, concentrate 22 into and through second membrane module 86.

Figure 5:
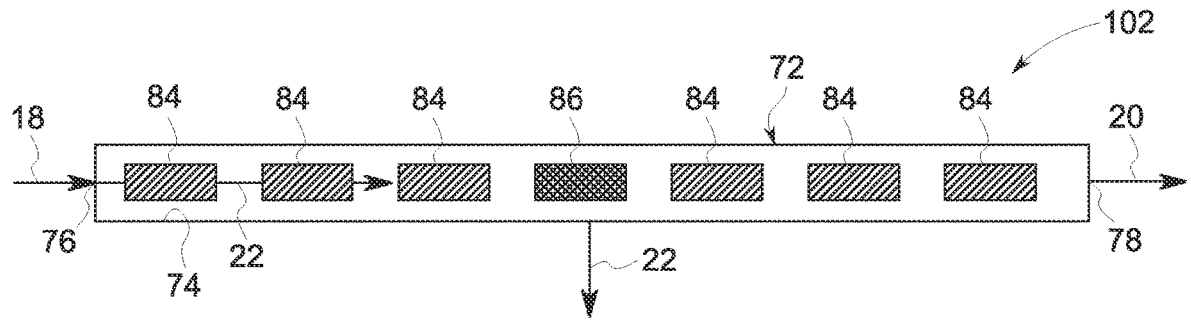
FIG. 5 is a schematic view of another alternative arrangement of the pressure vessel having the plurality of first membrane modules and the second membrane modules.

FIG. 5 is a schematic view of an alternative arrangement 102 of pressure vessel 74 having the plurality of first membrane modules 84 and second membrane modules 86. In FIG. 5 similar components include the same element numbers as shown in FIGS. 1-4. In the exemplary embodiment, second membrane module 86 is positioned within pressure vessel 74 and between a pair of first membrane modules 84 of the plurality of first membrane modules 84. Moreover, first membrane modules 84 and second membrane module 86 are coupled in series. Arrangement 102 is configured to desalinate feed solution 18 into concentrate 22 and permeate 20, wherein permeate 20 has salinity of at least of about 500 ppm. More particularly, during operation, inlet end 76 discharges feed solution 18 initially into and through first membrane module 84, and subsequently, concentrate 22 into and through second membrane module 86. After passing through second membrane module 86, concentrate 22 is discharged into subsequent first membrane modules 84.

Figure 6:
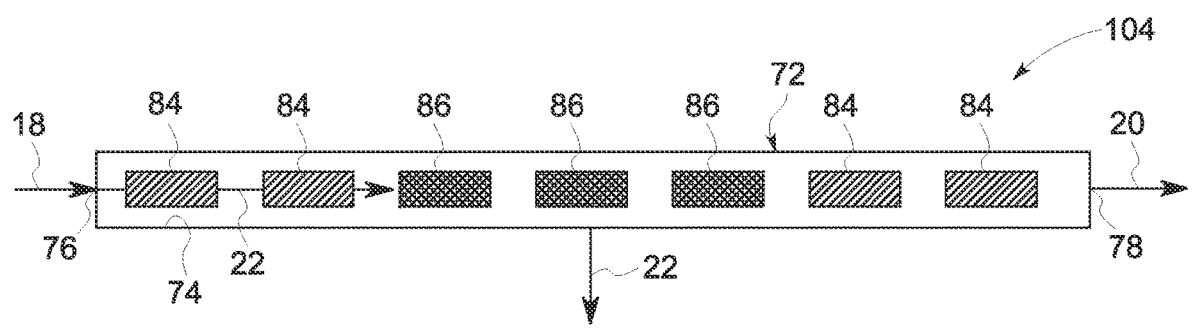
FIG. 6 is a schematic view of yet another alternative arrangement of the pressure vessel having the plurality of first membrane modules and the second membrane modules.

FIG. 6 is a schematic view of an alternative arrangement 104 of pressure vessel 74 having the plurality of first membrane modules 84 and second membrane modules 86. In FIG. 6 similar components include the same element numbers as shown in FIGS. 1-5. In the exemplary embodiment, a plurality of second membrane modules 86 is positioned within pressure vessel 74 and between a pair of first membrane modules 84 of the plurality of first membrane modules 84. Moreover, first membrane modules 84 and second membrane module 86 are coupled in series. Arrangement 104 is configured to desalinate feed solution 18 into concentrate 22 and permeate 20, wherein permeate 20 has salinity of at least of about 500 ppm. More particular, during operation, inlet end 76 discharges feed solution 18 initially into and through first membrane modules 84, and subsequently, concentrate 22 into and through second membrane modules 86. After passing through second membrane modules 86, concentrate 22 is discharged into subsequent first membrane modules 84.

Figure 7:
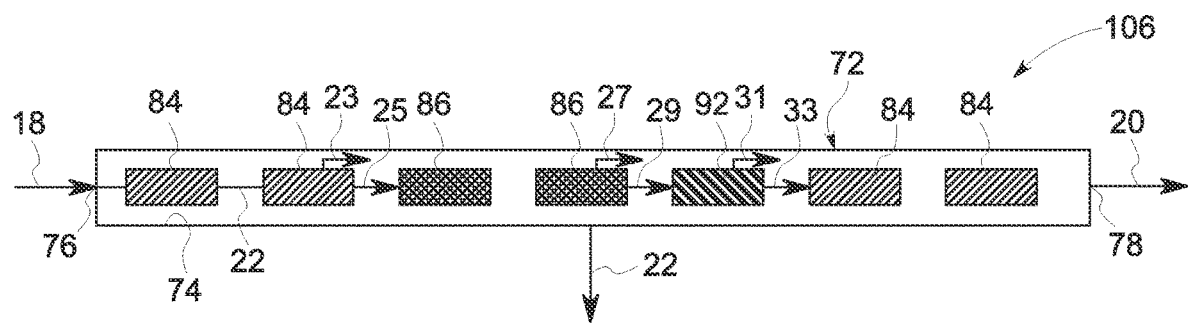
FIG. 7 is a schematic view of a further alternative arrangement of the pressure vessel having the plurality of first membrane modules, the second membrane modules, and a third membrane module.

FIG. 7 is a schematic view of an alternative arrangement 106 of pressure vessel 74 having the plurality of first membrane modules 84, second membrane modules 86, and third membrane module 92. In FIG. 7, similar components have the same element numbers as shown in FIGS. 1-6. In the exemplary embodiment, secondary modules 86 are positioned within pressure vessel 74 and among the plurality of first membrane modules 84. Moreover, first membrane modules 84 and second membrane module 86 are coupled in series. Moreover, third membrane module 92 is positioned in series within pressure vessel 74 and between second membrane modules 86 and outlet end. More particularly, third membrane module 92 is positioned between second membrane module 86 and subsequent first membrane modules 84. Arrangement 106 is configured to desalinate feed solution 18 into concentrate 22 and permeate 20, wherein permeate 20 has salinity of at least of about 500 ppm. More particularly, during operation, inlet end 76 discharges feed solution 18 initially into and through first membrane modules 84. First membrane module 84 is configured to desalinate feed solution 18 into first permeate 23 and first concentrate 25. First concentrate 25 is discharged into second membrane module 86 which is configured to desalinate first concentrate 25 into second permeate 27 and second concentrate 29. Second concentrate 29 is discharged into third membrane module 92 which is configured to desalinate second concentrate 29 into third permeate 31 and third concentrate 33. Collective permeate 20 which includes a combination of at least one of first permeate 23, second permeate 27, and third permeate 31 has a salinity of at least about 500 ppm. Alternatively, third membrane module 92 may be positioned between inlet end 76 and first membrane module 84 and/or second membrane module 86.

Table 1 illustrates properties of first membrane modules 84, second membrane modules 86, and third membrane modules 92 used in the exemplary arrangements shown in FIGS. 8-12. In the exemplary embodiments, water permeate values and salt permeate values are measured at standard seawater reverse osmosis testing conditions such as, but not limited to, 35,000 ppm NaCl, 25° C., 800 psi, pH 8.0 and 8% recovery.

TABLE I

| Membrane | Water Permeate value ($10^{-5}$ cm$^3$/cm$^2$-s-atm) | Salt Permeate value ($10^{-5}$ cm/s) |
| --- | --- | --- |
| First Membrane Module 84 | 4 | 0.4 |
| Second membrane module 86 | 6.8 | 6 |
| Third membrane module 92 | 7.2 | 12 |

Figure 8:
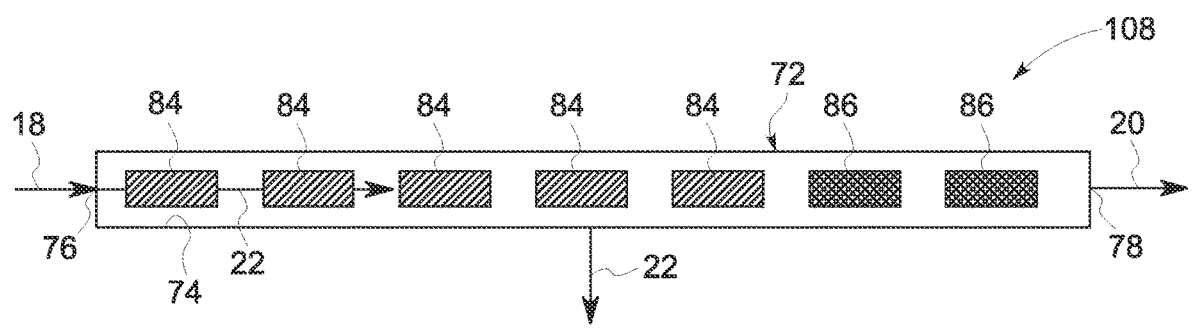
FIG. 8 illustrates another alternative arrangement of the pressure vessel having the first membrane modules and second membrane modules coupled in series within the pressure vessel of the reverse osmosis system shown in FIG. 1.

Example 1: FIG. 8

FIG. 8 illustrates an alternative arrangement 108 of pressure vessel 74 having first membrane modules 84 and second membrane modules 86 coupled in series within pressure vessel 74. Although a single pressure vessel 74 is shown in FIG. 8, arrangement 108 includes thirty pressure vessels 74 (not shown) position in parallel. In the exemplary embodiment, each pressure vessel 74 includes five first membrane modules 84 having first salt permeance value 88 of $0.4 \times 10^{-5}$ cm/s. First membrane modules 84 are positioned in series and adjacent inlet end 76. Arrangement 108 further includes two second membrane modules 86 having second salt permeance value 90 of $6 \times 10^{-5}$ cm/s. Second membrane modules 86 are positioned between first membrane modules 84 and outlet end 78. Feed solution 18 includes sea water having fluid characteristics 44 such as, but not limited to, total dissolved solids ("TDS") of 35,000 ppm, 25° C., and transmembrane pressure of 755 psi. Arrangement 108 is configured to desalinate feed solution 18 into concentrate 22 and permeate 20, wherein permeate 20 has salinity of about 1,442 ppm.

Figure 9:
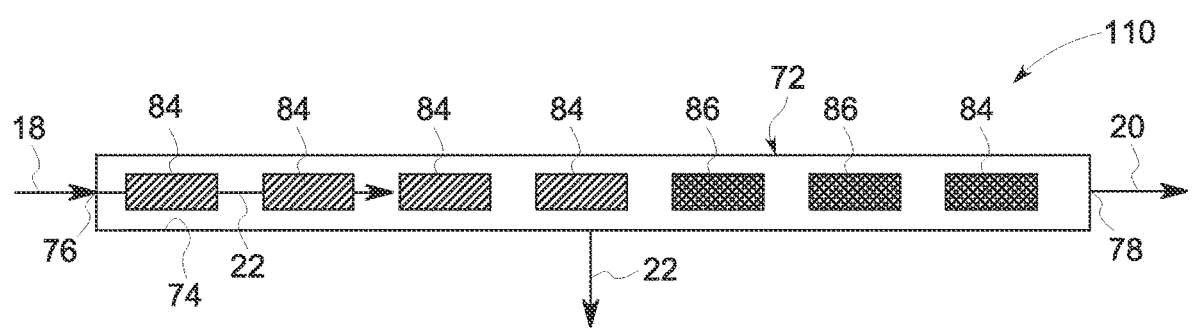
FIG. 9 illustrates yet another alternative arrangement of the pressure vessel having the first membrane modules and the second membrane modules coupled in series within the pressure vessel.

Example 2: FIG. 9

FIG. 9 illustrates an alternative arrangement 110 of pressure vessel 74 having first membrane modules 84 and second membrane modules 86 coupled in series within pressure vessel 74. Although a single pressure vessel 74 is shown in FIG. 9, arrangement 110 includes thirty pressure vessels 74 (not shown) positioned in parallel. In the exemplary embodiment, each pressure vessel 74 includes four first membrane modules 84 having first salt permeance value 88 of $0.4 \times 10^{-5}$ cm/s. First membrane modules 84 are positioned in series and adjacent inlet end 76. Arrangement 110 further includes two second membrane modules 86 in series having second salt permeance value 90 of $6 \times 10^{-5}$ cm/s. Second membrane modules 86 are positioned between first membrane modules 84 and outlet end 78. Arrangement 110 further includes a single first membrane module having first salt permeance value 88 of $0.4 \times 10^{-5}$ cm/s. Single first membrane module 84 is positioned between second membrane modules 86 and outlet end 78. Feed solution 18 includes sea water having fluid characteristics 44, such as, but not limited to, TDS of 35,000 ppm, 25° C. and transmembrane pressure of 766 psi. Arrangement 110 is configured to desalinate feed solution 18 into concentrate 22 and permeate 20, wherein permeate 20 has salinity of about 1,433 ppm.

Figure 10:
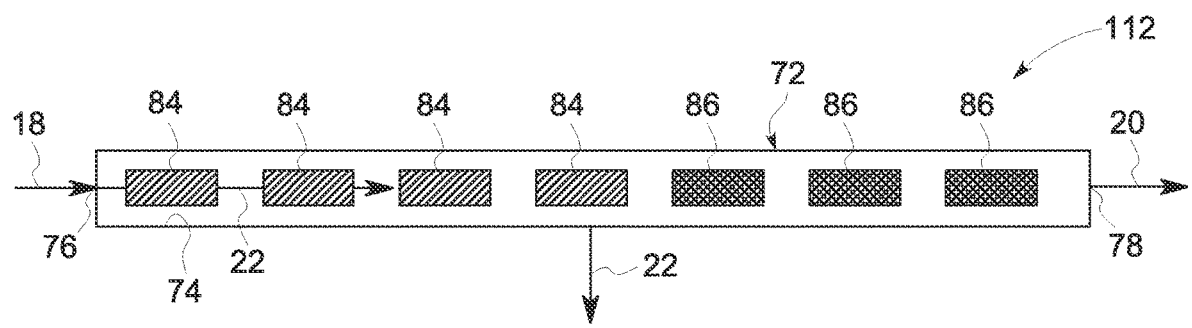
FIG. 10 illustrates another alternative arrangement of the pressure vessel having the first membrane modules and the second membrane modules coupled in series within the pressure vessel.

Example 3: FIG. 10

FIG. 10 illustrates an alternative arrangement 112 of pressure vessel 74 having first membrane modules 84 and second membrane modules 86 coupled in series within pressure vessel 74. Although a single pressure vessel 74 is shown in FIG. 10, arrangement includes thirty pressure vessels 74 (not shown) positioned and parallel. In the exemplary embodiment, each pressure vessel 74 includes four first membrane modules 84 having first salt permeance value 88 of $0.4 \times 10^{-5}$ cm/s. First membrane modules 84 are positioned in series and adjacent inlet end 76. Arrangement 112 further includes three second membrane modules 86 having second salt permeance value 90 of $6 \times 10^{-5}$ cm/s. Second membrane modules 86 are positioned between first membrane modules 84 and outlet end 78. Feed solution 18 includes sea water having fluid characteristics 44 such as, but not limited to, TDS of 35,000 ppm, 25° C., and transmembrane pressure of 732 psi. Arrangement 112 is configured to desalinate feed solution 18 into concentrate 22 and permeate 20, wherein permeate 20 has salinity of about 1,954 ppm.

Figure 11:
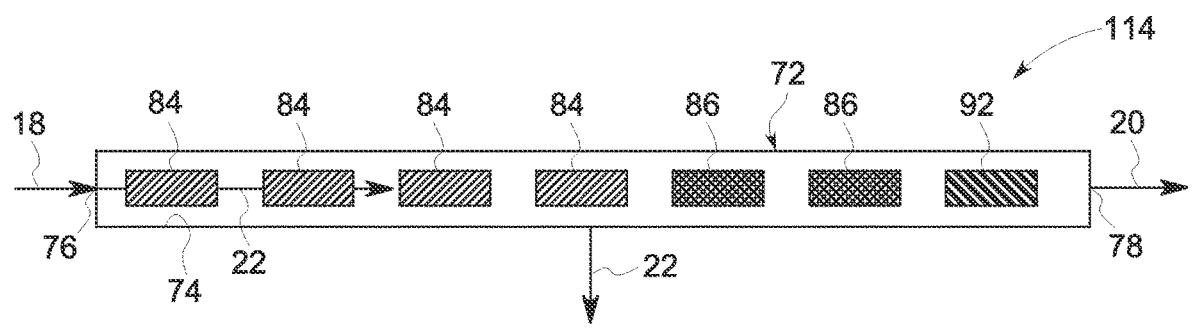
FIG. 11 illustrates another alternative arrangement of the pressure vessel having the first membrane modules, the second membrane modules, and a third membrane module coupled in series within the pressure vessel.

Example 4: FIG. 11

FIG. 11 illustrates an alternative arrangement 114 of pressure vessel 74 having first membrane modules 84, second membrane modules 86, and third membrane module 92 coupled in series within pressure vessel 74. Although a single pressure vessel 74 is shown in FIG. 11, arrangement 114 includes thirty pressure vessels 74 (not shown) positioned and parallel. The exemplary embodiment, each pressure vessel 74 includes four first membrane modules 84 having first salt permeance value 88 of $0.4\times10^{-5}$ cm/s. First membrane modules 84 are positioned in series and adjacent inlet end 76. Arrangement 114 further includes two second membrane modules 86 having second salt permeance of $6\times10^{-5}$ cm/s. Second membrane modules 86 are positioned between first membrane modules 84 and third membrane module 92. Arrangement 114 further includes third membrane module 92 having third salt permeance value 94 of $12\times10^{-5}$ cm/s. Third membrane module 92 is positioned between second membrane modules 86 and outlet end 78. Feed solution 18 includes sea water having fluid characteristics 44 such as, but not limited to, TDS of 35,000 ppm, 25 degree temperature and transmembrane pressure of 715 psi. Arrangement 114 is configured to desalinate feed solution 18 into a concentrate 22 and permeate 20, wherein permeate 20 has salinity of about 2,485 ppm.

Figure 12:
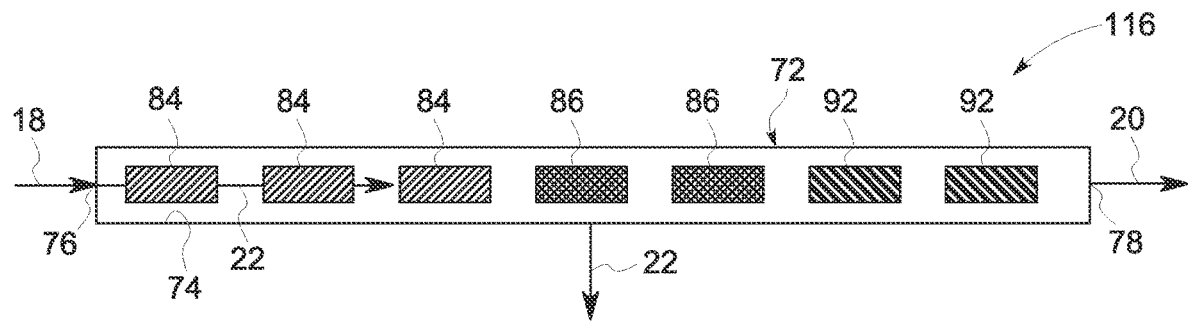
FIG. 12 illustrates yet another alternative arrangement of the pressure vessel having the first membrane modules, the second membrane modules, and the third membrane modules coupled in series within the pressure vessel.

Example 5: FIG. 12

FIG. 12 illustrates an alternative arrangement 116 of pressure vessel 74 having first membrane modules 84, second membrane modules 86, and third membrane modules 92 coupled in series within pressure vessel 74. Although a single pressure vessel 74 is shown in FIG. 12, arrangement 116 includes thirty pressure vessels 74 (not shown) positioned in parallel. In the exemplary embodiment, each pressure vessel 74 includes four first membrane modules 84 having first salt permeance value 88 of $0.4\times10^{-5}$ cm/s. First membrane modules 84 are positioned in series and adjacent inlet end 76. Arrangement 116 further includes two second membrane modules 86 having second salt permeance of $6\times10^{-5}$ cm/s. Second membrane modules 86 are positioned between first membrane modules 84 and a third membrane modules 92. Arrangement 116 further includes two third membrane modules 92 having third salt permeance value 94 of $12\times10^{-5}$ cm/s. Third membrane modules 92 are positioned between second membrane modules 86 and outlet end 78. Feed solution 18 includes sea water having fluid characteristics 44 such as, but not limited to, TDS of 35,000 ppm, 25° C.° C., and transmembrane pressure of 684 psi. Arrangement 116 is configured to desalinate feed solution 18 into a concentrate 22 and permeate 20, wherein permeate 20 has salinity of about 3,422 ppm.

FIG. 13 is a schematic view of an alternative reverse osmosis system 118 such as, but not limited to, a permeate-staged reverse osmosis system. In FIG. 13, similar components include the same element numbers as shown in FIGS. 1-12. Reverse osmosis system 118 includes a first reverse osmosis unit 120 and a second reverse osmosis unit 122 coupled in series and in flow communication to first reverse osmosis unit 120. More particularly, outlet end 78 of first reverse osmosis unit 120 is coupled in series and in flow communication with inlet end 124 of second osmosis unit 122. Each of first reverse osmosis unit 120 and second reverse osmosis unit 122 includes at least one of first membrane module 84, second membrane module 86, and third membrane module 92. During operation, feed solution 18 is discharged into and through pressure vessel 74 of first reverse osmosis unit 120. First reverse osmosis unit 120 discharges concentrate 22 out of outlet end 80. Moreover, first reverse osmosis unit 120 discharges a first permeate 126 from outlet end 78. First permeate 126 is discharged into inlet end 124 of second reverse osmosis unit 122. Second reverse osmosis unit 122 discharges concentrate 127 from an outlet end 128. Concentrate 127 has a different composition than concentrate 22. Moreover, second reverse osmosis unit 122 discharges a second permeate 132 from an outlet end 130, second permeate 132 includes a salinity of at least about 500 ppm.

FIG. 14 is a schematic view of an alternative reverse osmosis system 134 such as, but not limited to, a brine-staged unit. In FIG. 14, similar components include the same element numbers as shown in FIGS. 1-13. Reverse osmosis system 134 includes a first reverse osmosis unit 136 and a second reverse osmosis unit 138 coupled in parallel and in flow communication to first reverse osmosis unit 136. More particularly, outlet end 80 of first reverse osmosis unit 136 is coupled in parallel and in flow communication with inlet end 140 of second reverse osmosis unit 138. Each of first reverse osmosis unit 134 and second reverse osmosis unit 138 includes at least one of first membrane module 84, second membrane module 86, and optionally third membrane module 92. During operation, feed solution 18 is discharged into and through first reverse osmosis unit 136. First reverse osmosis unit 136 discharges a first concentrate 142 from outlet end 80. Moreover, first reverse osmosis unit 136 discharges a first permeate 144 out of outlet end 78. First concentrate 142 is discharged into inlet end 140 of second reverse osmosis unit 138. Second reverse osmosis unit 138 discharges a second concentrate 146 from outlet end 147. Moreover, second reverse osmosis unit 138 discharges a second permeate 150 from an outlet end 148. Second permeate 152 is discharged into first permeate 144 to form a combined permeate 154 having a salinity of at least about 500 ppm.

Figure 15:
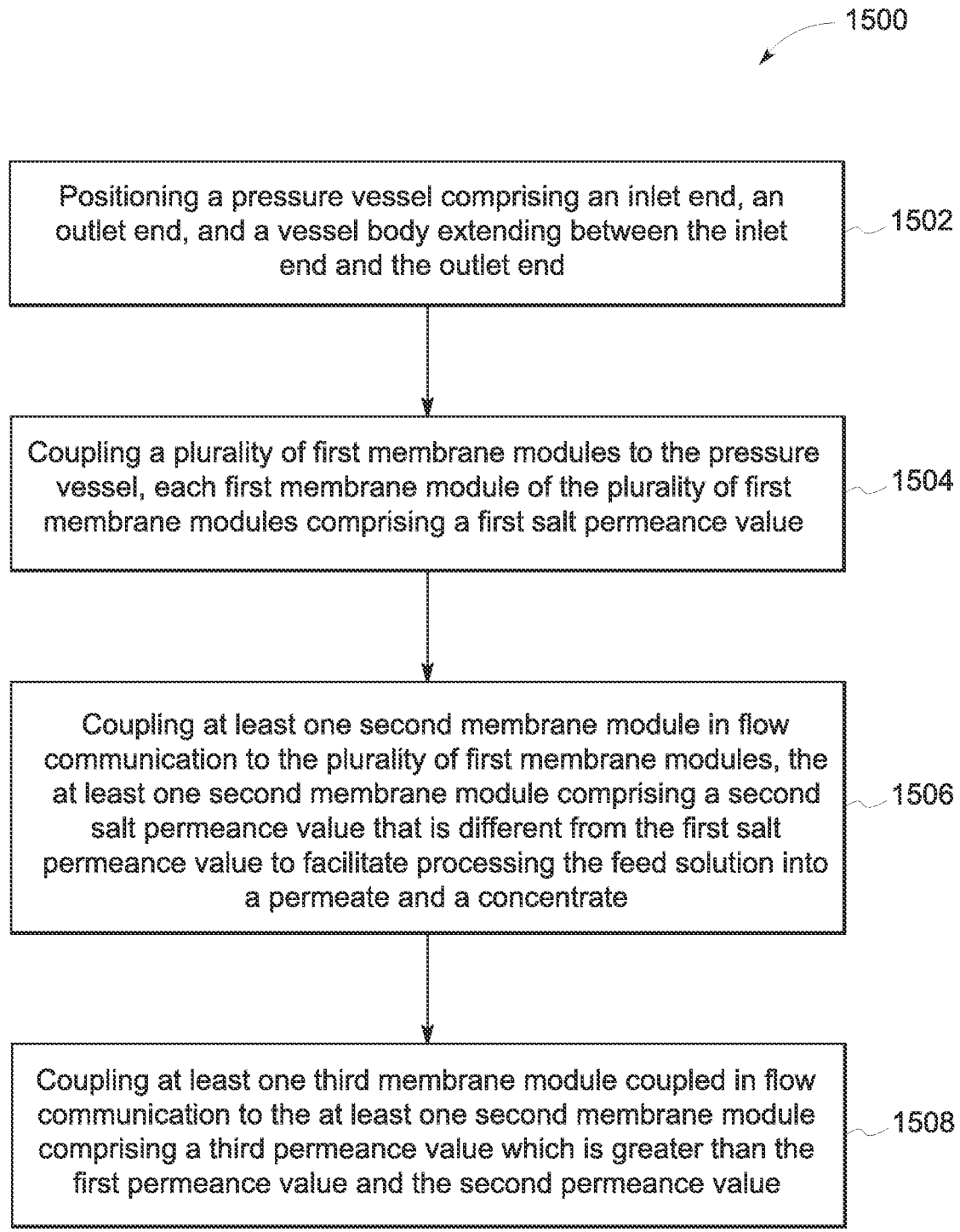
FIG. 15 is a flowchart illustrating an exemplary method of assembling the reverse osmosis system shown in FIG. 1 for processing a feed solution.

FIG. 15 is a flowchart illustrating an exemplary method 1500 of assembling a reverse osmosis system, such as reverse osmosis system 12 (shown in FIG. 1), to well casing 32 (shown in FIG. 1) for processing feed solution 18 (shown in FIG. 3). Method 1500 includes positioning 1502 pressure vessel 74 (show in FIG. 3). Pressure vessel 74 includes inlet end 76, outlet end 78, and vessel body 72 (all shown in FIG. 3) extending between the inlet end and the outlet end. Method 1500 further includes coupling 1504 the plurality of first membrane modules 84 (shown in FIG. 1) to the pressure vessel. In the exemplary method 1500, each first membrane module includes first salt permeance value 88 (shown in FIG. 3).

Method 1500 includes coupling 1506 at least one second membrane module 86 (shown in FIG. 3) in flow communication to the plurality of first membrane modules. In the exemplary method 1500, the at least one second membrane module includes second salt permeance value 90 (shown in FIG. 3) that is different from the first salt permeance value to facilitate processing the feed solution into permeate 20 and concentrate 22 (both shown in FIG. 3). Third membrane module 92 (shown in FIG. 2) is coupled 1508 in flow communication to the second membrane module In the exemplary method 1500, third membrane module includes third permeance value 94 (shown in FIG. 2) which is greater than the first salt permeance value and the second salt permeance value.

Figure 16:
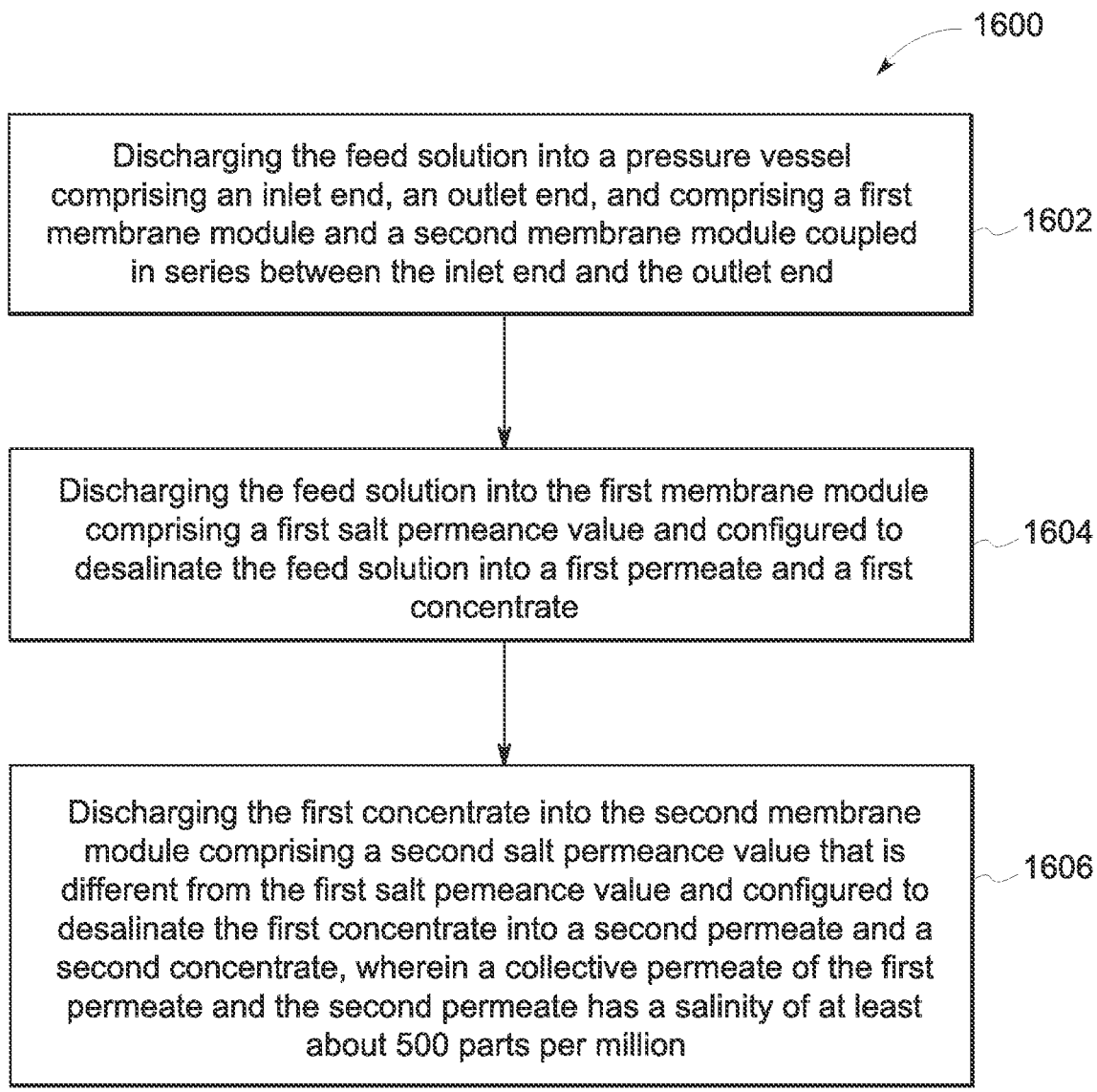
FIG. 16 is a flowchart illustrating an exemplary method of processing a feed solution into a permeate and a concentrate by the reverse osmosis unit shown in FIG. 1.

FIG. 16 is a flowchart illustrating an exemplary method 1600 of processing feed solution 18. Method 1600 includes discharging 1602 the feed solution into pressure vessel 74 having inlet end 76, outlet end 78, and having first membrane module 84 and second membrane module 86 coupled in series between the inlet end and the outlet end (all shown in FIG. 3). Method 1600 includes discharging 1604 the feed solution into the first membrane module having first salt permeance value 88 (shown in FIG. 3) and configured to desalinate the feed solution into first permeate 23 and first concentrate 25 (all shown in FIG. 2). Method 1600 includes discharging 1606 the first concentrate into the second membrane module having second salt permeance value 90 (shown in FIG. 3) that is different from the first salt permeance value and configured to desalinate the first concentrate into second permeate 27 and second concentrate 29, wherein collective permeate 20 (all shown in FIG. 2) of the first permeate and the second permeate has a salinity of at least about 500 parts per million.

Figure 17:
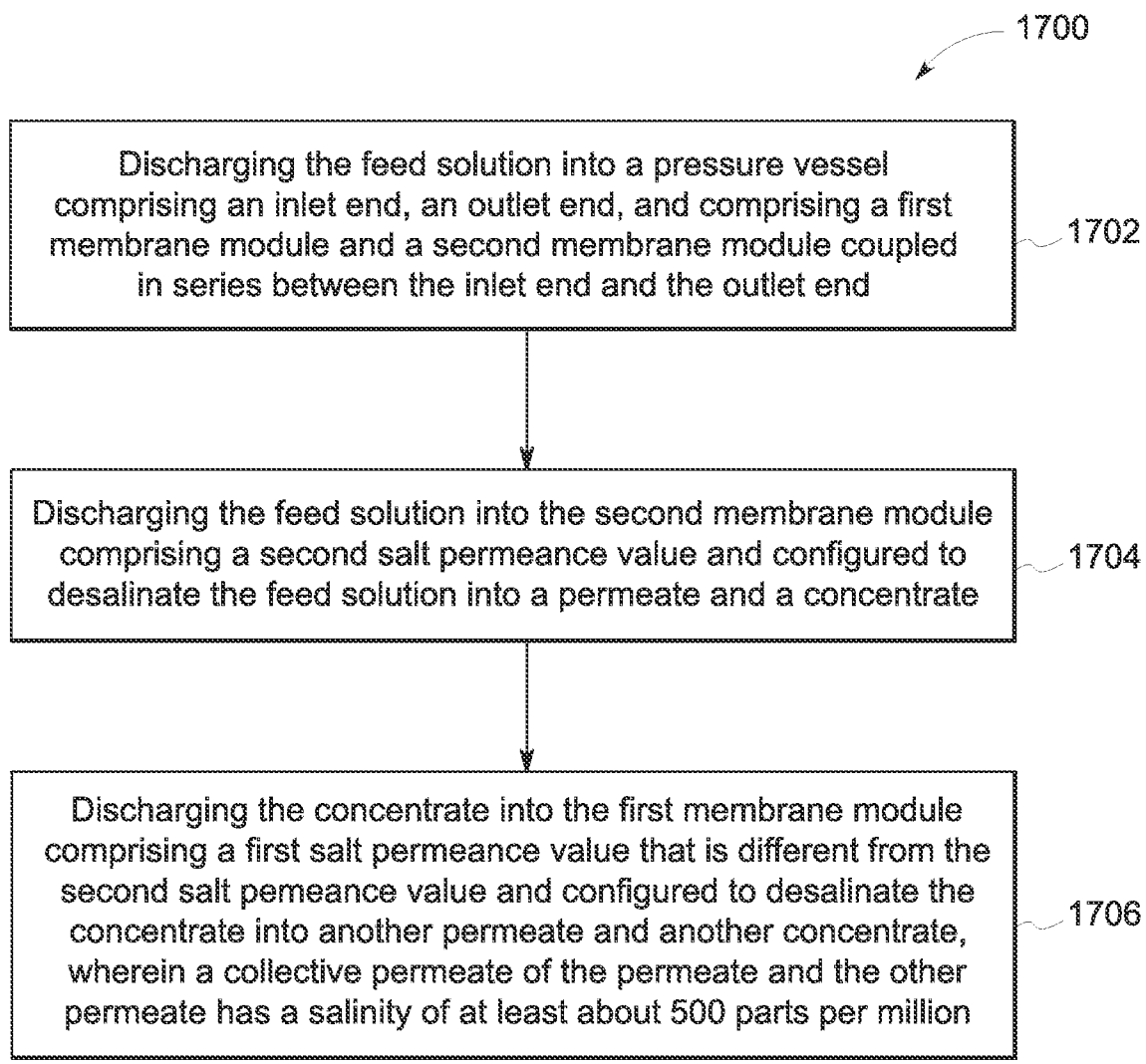
FIG. 17 is a flowchart illustrating an alternative method of processing a feed solution into a permeate and a concentrate by the reverse osmosis unit shown in FIG. 1.

FIG. 17 is a flowchart illustrating an exemplary method 1700 of processing feed solution 18. Method 1700 includes discharging 1702 the feed solution into pressure vessel 74 having inlet end 76, outlet end 78, and having first membrane module 84 and second membrane module 86 coupled in series between the inlet end and the outlet end (all shown in FIG. 3). Method 1700 includes discharging 1704 the feed solution into the second membrane module having second salt permeance value and configured to desalinate the feed solution into permeate 27 and concentrate 29 (shown in FIG. 2). Method 1700 further includes discharging 1706 the concentrate into the first membrane module having first salt permeance value 88 (shown in FIG. 3) that is different from the second salt permeance value and configured to desalinate the concentrate into another permeate 23 and another concentrate 25 (shown in FIG. 2), wherein collective permeate 20 of the permeate and other permeate has a salinity of at least about 500 parts per million.

Figure 18:
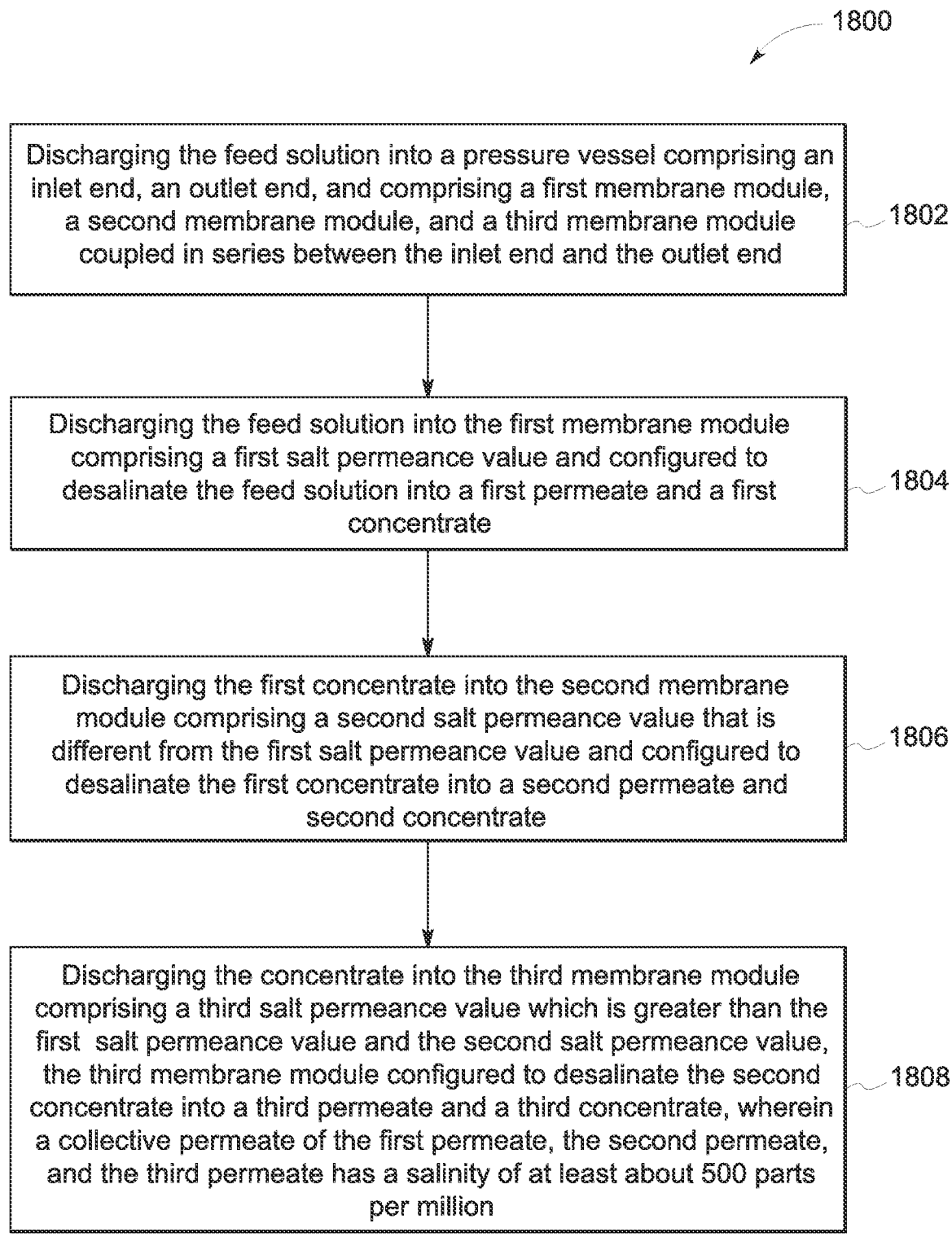
FIG. 18 is a flowchart illustrating an alternative method of processing a feed solution into a permeate and a concentrate by the reverse osmosis unit shown in FIG. 1.

FIG. 18 is a flowchart illustrating an exemplary method 1800 of processing feed solution 18. Method 1800 includes discharging 1802 the feed solution into pressure vessel 74 having inlet end 76, outlet end 78, and having first membrane module 84 and second membrane module 86 coupled in series between the inlet end and the outlet end (all shown in FIG. 3). Method 1800 includes discharging 1804 the feed solution into the first membrane module having first salt permeance value 88 (shown in FIG. 3) and configured to desalinate the feed solution into first permeate 23 and first concentrate (shown in FIG. 7). Method 1800 includes discharging 1806 the first concentrate into the second membrane module having second salt permeance value 90 (shown in FIG. 3) that is different from the first salt permeance value and configured to desalinate the first concentrate into second permeate 27 and second concentrate 29 (shown in FIG. 7). Method 1800 includes discharging 1808 the second concentrate into third membrane modules 92 (shown in FIG. 3) having a third salt permeance value 94 (shown in FIG. 3) which is greater than the first salt permeance value and the second salt permeance value, the third membrane module configured to desalinate the second concentrate into third permeate 31 and third concentrate 33 (shown in FIG. 7), wherein collective permeate 20 (shown in FIG. 7) of the first permeate, the second permeate, and the third permeate has a salinity of at least about 500 parts per million.

Figure 19:
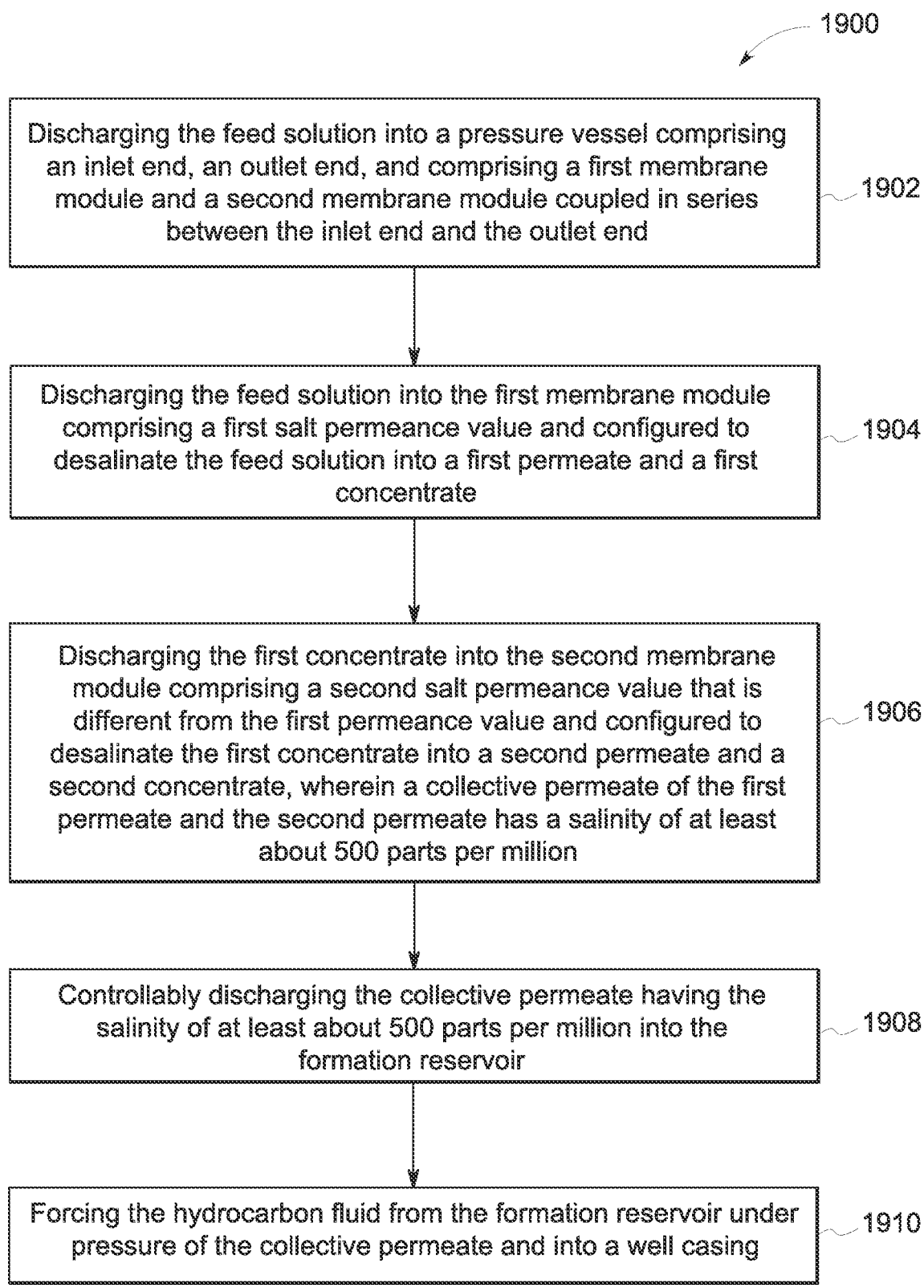
FIG. 19 is a flowchart illustrating an exemplary method of recovering a hydrocarbon fluid from a formation reservoir.

FIG. 19 is a flowchart illustrating an exemplary method 1900 of recovering a hydrocarbon fluid, such as fluid 30 (shown in FIG. 1), from a formation reservoir, for example formation 28 (shown in FIG. 1). Method 1900 includes discharging 1902 feed solution 18 into pressure vessel 74 having inlet end 76, outlet end 78, and having first membrane module 84 and second membrane module 86 coupled in series between the inlet end and the outlet end (all shown in FIG. 2). Method 1900 includes discharging 1904 the feed solution into the first membrane module having first salt permeance value 88 (shown in FIG. 3) and configured to desalinate the feed solution into first permeate 23 and first concentrate 25 (shown in FIG. 2). Method 1900 includes discharging 1906 the first concentrate into the second membrane module having second salt permeance value 90 (shown in FIG. 3) that is different from the first salt permeance value and configured to desalinate the first concentrate into second permeate 25 and second concentrate 27, wherein collective permeate 20 of the first permeate and the second permeate has a salinity of at least about 500 parts per million. Method 1900 further includes controllably discharging 1908 at least a portion of the collective permeate having the salinity of at least about 500 parts per million into the formation reservoir. Method 1900 further includes forcing 1910 the hydrocarbon fluid from the formation reservoir under pressure of the collective permeate and into a well casing.

The exemplary embodiments described herein provide for a reverse osmosis system for cost effective and efficient recovery processes for a production fluid. The exemplary embodiments described herein provide for a reverse osmosis unit that desalinates a feed solution into a concentrate and a permeate that is optimal for enhanced recovery of production fluid. Moreover, the embodiments described herein form a permeate having a salinity of at least about 500 parts per million. The reverse osmosis system includes controllably adjusting the feed solution trough reverse osmosis units. The reverse osmosis system decreases design, installation, operational, maintenance, and/or replacement costs for a well site.

A technical effect of the systems and methods described herein includes at least one of: (a) enhancing recovery of production fluid from a geological formation; (b) discharging a feed solution through different membrane modules having different salt permeance values; (c) controlling fluid characteristics of a feed solution while discharging the feed solution through a pressure vessel; (d) forming a permeate having a salinity of at least about 500 parts per million; and (e) decreasing design, installation, operational, maintenance, and/or replacement costs for a well site.

The term "processor" is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor. The above examples are exemplary only, and thus are not intended to limit in any way the definition and/or meaning of the term processor.

Exemplary embodiments of a reverse osmosis system and methods for assembling a deployment are described herein. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment may be implemented and utilized in connection with many other fluid and/or gas applications.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of recovering a hydrocarbon fluid from a formation reservoir, said method comprising:
   discharging a feed solution into a pressure vessel comprising an inlet end, an outlet end, and comprising a plurality of membrane modules including one or more first membrane modules and one or more second membrane modules coupled in series between the inlet end and the outlet end;
   discharging the feed solution into the one or more first membrane modules comprising a first salt permeance value and configured to desalinate the feed solution into a first permeate and a first concentrate; and
   discharging the first concentrate into the one or more second membrane modules comprising a second salt permeance value that is greater than the first salt permeance value by a difference of at least about $0.4 \times 10^{-5}$ cm/sec. and configured to desalinate the first concentrate into a second permeate and a second concentrate, wherein a collective permeate of the plurality of membrane modules has a salinity of at least about 500 parts per million;
   controllably discharging at least a portion of the collective permeate having the salinity of at least about 500 parts per million into the formation reservoir; and
   forcing the hydrocarbon fluid from the formation reservoir under pressure of the collective permeate and into a well casing.

2. The method of claim 1 further comprising discharging the second concentrate into one or more third membrane modules of the plurality of membrane modules comprising a third permeance value which is greater than the first salt permeance value and the second salt permeance value.

3. The method of claim 1 wherein controllably discharging the collective permeate having the salinity of at least about 500 parts per million comprises discharging the collective permeate at least one of an adjustable flow rate and an adjustable pressure rate.

* * * * *